(12) United States Patent
Liu et al.

(10) Patent No.: US 12,317,338 B2
(45) Date of Patent: May 27, 2025

(54) MOBILE-ORIGINATED DATA OVER DEDICATED PRECONFIGURED UPLINK RESOURCE WHILE IN AN IDLE MODE OR AN INACTIVE MODE

(71) Applicant: QUALCOMM Incorporated, San Diego, CA (US)

(72) Inventors: Huichun Liu, Beijing (CN); Gavin Bernard Horn, La Jolla, CA (US); Miguel Griot, La Jolla, CA (US); Peng Cheng, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 328 days.

(21) Appl. No.: 17/629,662

(22) PCT Filed: Aug. 20, 2019

(86) PCT No.: PCT/CN2019/101522
§ 371 (c)(1),
(2) Date: Jan. 24, 2022

(87) PCT Pub. No.: WO2021/031108
PCT Pub. Date: Feb. 25, 2021

(65) Prior Publication Data
US 2022/0256618 A1    Aug. 11, 2022

(51) Int. Cl.
*H04W 74/0833* (2024.01)
*H04W 74/00* (2009.01)
(Continued)

(52) U.S. Cl.
CPC ..... *H04W 74/0841* (2013.01); *H04W 74/004* (2013.01); *H04W 74/04* (2013.01);
(Continued)

(58) Field of Classification Search
None
See application file for complete search history.

(56) References Cited

U.S. PATENT DOCUMENTS 10,680,956 B2 * 6/2020 Huang .................... H04L 47/16
2015/0009936 A1   1/2015 Quan et al.
(Continued)

FOREIGN PATENT DOCUMENTS

CN    101350946 A    1/2009
CN    106134099 A    11/2016
(Continued)

OTHER PUBLICATIONS

Supplementary European Search Report—EP19942362—Search Authority—The Hague—Apr. 4, 2023.
(Continued)

*Primary Examiner* — Lonnie V Sweet
(74) *Attorney, Agent, or Firm* — Harrity & Harrity, L.L.P \ Qualcomm

(57) ABSTRACT

Various aspects of the present disclosure generally relate to wireless communication. In some aspects, a user equipment (UE) may receive information related to a dedicated preconfigured uplink resource (DPUR) in a message releasing the UE to an idle mode or an inactive mode. For example, in some aspects, the information related to the DPUR may identify one or more uplink resources that are allocated to the UE to enable the UE to initiate an uplink data transmission in the idle mode or the inactive mode. The UE may transmit, based at least in part on the information related to the DPUR, uplink data while in the idle mode or the inactive mode. Numerous other aspects are provided.

37 Claims, 8 Drawing Sheets

(51) Int. Cl.
*H04W 74/04* (2009.01)
*H04W 74/08* (2024.01)
*H04W 76/20* (2018.01)
*H04W 76/30* (2018.01)

(52) U.S. Cl.
CPC ....... *H04W 74/0866* (2013.01); *H04W 76/20* (2018.02); *H04W 76/30* (2018.02)

(56) References Cited

U.S. PATENT DOCUMENTS

| | | | |
|---|---|---|---|
| 2016/0105917 A1* | 4/2016 | Miao | H04W 76/27 370/329 |
| 2016/0374048 A1 | 12/2016 | Griot et al. | |
| 2017/0078933 A1 | 3/2017 | Li et al. | |
| 2018/0077696 A1* | 3/2018 | Lee | H04W 74/0833 |
| 2018/0139778 A1 | 5/2018 | Chou et al. | |
| 2018/0234941 A1 | 8/2018 | Kim et al. | |
| 2018/0255421 A1 | 9/2018 | Hua et al. | |
| 2018/0270713 A1 | 9/2018 | Park et al. | |
| 2019/0159197 A1 | 5/2019 | Shrestha et al. | |
| 2021/0007148 A1* | 1/2021 | Selvaganapathy | H04W 72/23 |
| 2021/0259027 A1* | 8/2021 | Deogun | H04W 72/0453 |
| 2021/0321360 A1* | 10/2021 | Wong | H04W 68/00 |
| 2021/0345372 A1* | 11/2021 | Li | H04W 72/27 |
| 2021/0352691 A1* | 11/2021 | Li | H04W 72/21 |
| 2022/0167385 A1* | 5/2022 | Takeda | H04L 1/1671 |
| 2022/0217677 A1* | 7/2022 | Takeda | H04W 72/02 |
| 2022/0225357 A1* | 7/2022 | Yan | H04W 68/005 |

FOREIGN PATENT DOCUMENTS

| | | | |
|---|---|---|---|
| CN | 107155221 A | 9/2017 | |
| CN | 109392061 A | 2/2019 | |
| WO | WO-2020029175 A1 * | 2/2020 | ........ H04W 52/0235 |
| WO | WO-2021026739 A1 * | 2/2021 | |

OTHER PUBLICATIONS

ZTE Corporation: "Further Consideration on UL Aspects of D-PUR in IDLE", 3GPP TSG-RAN2 meeting#105, R2-1901477, 3rd Generation Partnership Project (3GPP), Mobile Competence Centre, 650, Route Des Lucioles, F-06921 Sophia-Antipolis Cedex, France, No. Feb. 25-Mar. 1, 2019, 11 Pages, XP051602835, Section 2.1-2.5.

Huawei, et al., "Uplink Transmission in Dedicated Pre-configured Resource", 3GPP TSG-RAN WG2 Meeting #104, R2-1816401, Spokane, USA, Nov. 12-16, 2018, pp. 1-5.

International Search Report and Written Opinion—PCT/CN2019/101522—ISA/EPO—May 18, 2020.

Lenovo, et al., "UL Transmission in Preconfigured Resources for NBIoT," 3GPP TSG RAN WG1 Meeting #96bis, R1-1904569, Apr. 12, 2019 (Apr. 12, 2019), sections 1, 2, 5 pages.

ZTE Corporation, et al., "Further Consideration on UL Aspects of D-PUR in IDLE", 3GPP TSG-RAN2 meeting#105bis, R2-1903485, Xi'an, China, Apr. 8-12, 2019, 11 Pages.

* cited by examiner

MOBILE-ORIGINATED DATA OVER DEDICATED PRECONFIGURED UPLINK RESOURCE WHILE IN AN IDLE MODE OR AN INACTIVE MODE

CROSS-REFERENCE TO RELATED APPLICATION

This application is a 371 national stage of Patent Cooperation Treaty (PCT) Application No. PCT/CN2019/101522 filed on Aug. 20, 2019, entitled "MOBILE-ORIGINATED DATA OVER DEDICATED PRECONFIGURED UPLINK RESOURCE WHILE IN AN IDLE MODE OR AN INACTIVE MODE," which is hereby expressly incorporated by reference herein.

FIELD OF THE DISCLOSURE

Aspects of the present disclosure generally relate to wireless communication and to techniques and apparatuses for mobile-originated data over a dedicated preconfigured uplink resource while in an idle mode or an inactive mode.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include: receiving information related to a dedicated preconfigured uplink resource (DPUR) in a message releasing the UE to an idle mode or an inactive mode, wherein the information related to the DPUR identifies one or more uplink resources allocated to the UE to initiate an uplink data transmission in the idle mode or the inactive mode; and transmitting, based at least in part on the information related to the DPUR, uplink data while in the idle mode or the inactive mode.

In some aspects, a method of wireless communication, performed by a base station, may include: transmitting, to a UE, information related to a DPUR in a message releasing the UE to an idle mode or an inactive mode, wherein the information related to the DPUR identifies one or more uplink resources allocated to the UE; and receiving, from the UE, uplink data while the UE is in the idle mode or the inactive mode.

In some aspects, a UE for wireless communication may include a memory and one or more processors coupled with the memory. The memory and the one or more processors may be configured to: receive information related to a DPUR in a message releasing the UE to an idle mode or an inactive mode, wherein the information related to the DPUR identifies one or more uplink resources allocated to the UE to initiate an uplink data transmission in the idle mode or the inactive mode; and transmit, based at least in part on the information related to the DPUR, uplink data while in the idle mode or the inactive mode.

In some aspects, a base station for wireless communication may include a memory and one or more processors coupled with the memory. The memory and the one or more processors may be configured to: transmit, to a UE, information related to a DPUR in a message releasing the UE to an idle mode or an inactive mode, wherein the information related to the DPUR identifies one or more uplink resources allocated to the UE; and receive, from the UE, uplink data while the UE is in the idle mode or the inactive mode.

In some aspects, a non-transitory computer-readable medium may store one or more instructions for wireless communication. The one or more instructions, when executed by one or more processors of a UE, may cause the one or more processors to: receive information related to a DPUR in a message releasing the UE to an idle mode or an inactive mode, wherein the information related to the DPUR identifies one or more uplink resources allocated to the UE to initiate an uplink data transmission in the idle mode or the inactive mode; and transmit, based at least in part on the information related to the DPUR, uplink data while in the idle mode or the inactive mode.

In some aspects, a non-transitory computer-readable medium may store one or more instructions for wireless communication. The one or more instructions, when executed by one or more processors of a base station, may cause the one or more processors to: transmit, to a UE, information related to a DPUR in a message releasing the UE to an idle mode or an inactive mode, wherein the information related to the DPUR identifies one or more uplink resources allocated to the UE; and receive, from the UE, uplink data while the UE is in the idle mode or the inactive mode.

In some aspects, an apparatus for wireless communication may include: means for receiving information related to a DPUR in a message releasing the apparatus to an idle mode or an inactive mode, wherein the information related to the DPUR identifies one or more uplink resources allocated to the apparatus to initiate an uplink data transmission in the idle mode or the inactive mode; and means for transmitting, based at least in part on the information related to the DPUR, uplink data while in the idle mode or the inactive mode.

In some aspects, an apparatus for wireless communication may include: means for transmitting, to a UE, information related to a DPUR in a message releasing the UE to an idle mode or an inactive mode, wherein the information related to the DPUR identifies one or more uplink resources allocated to the UE; and means for receiving, from the UE, uplink data while the UE is in the idle mode or the inactive mode.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
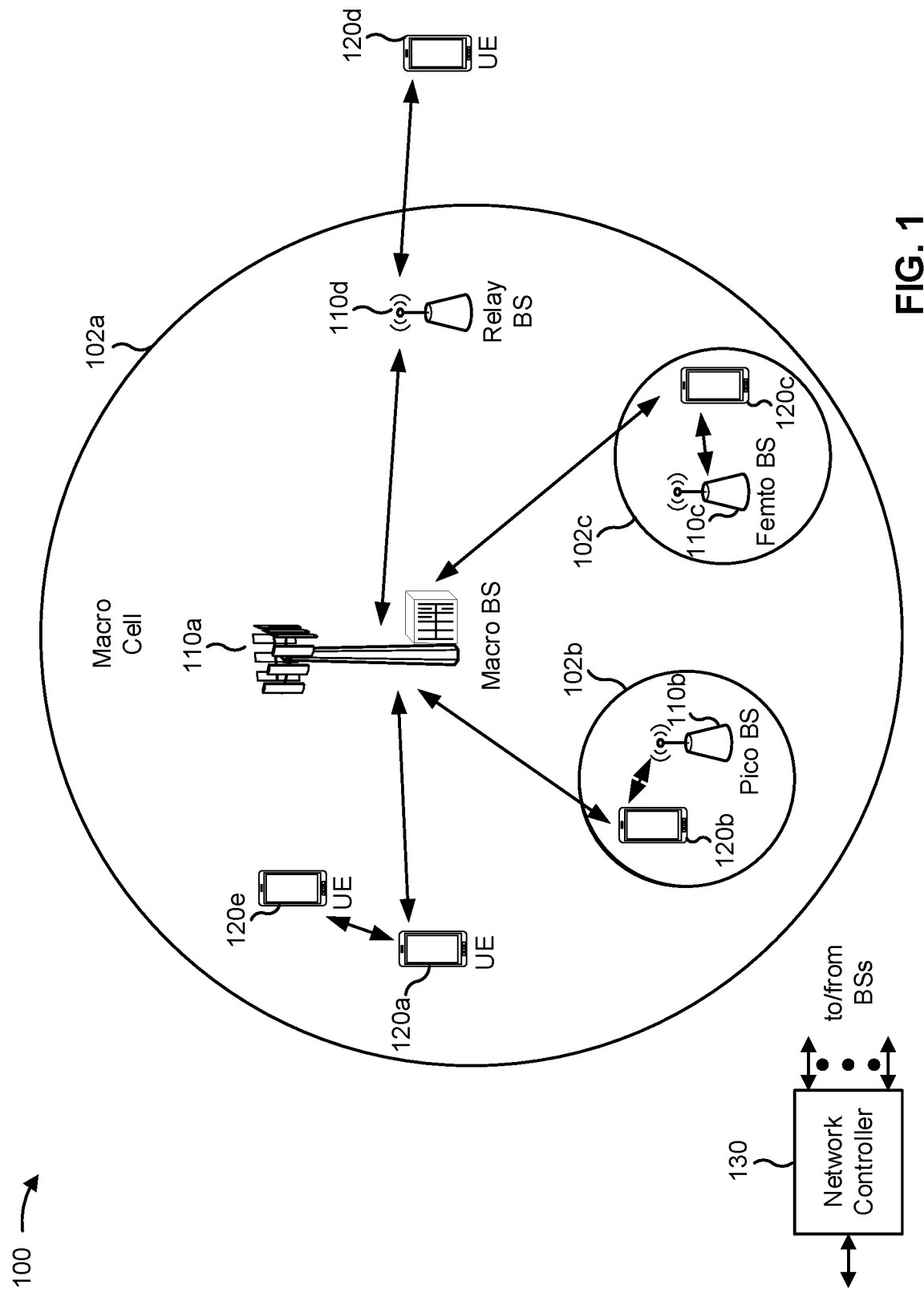
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
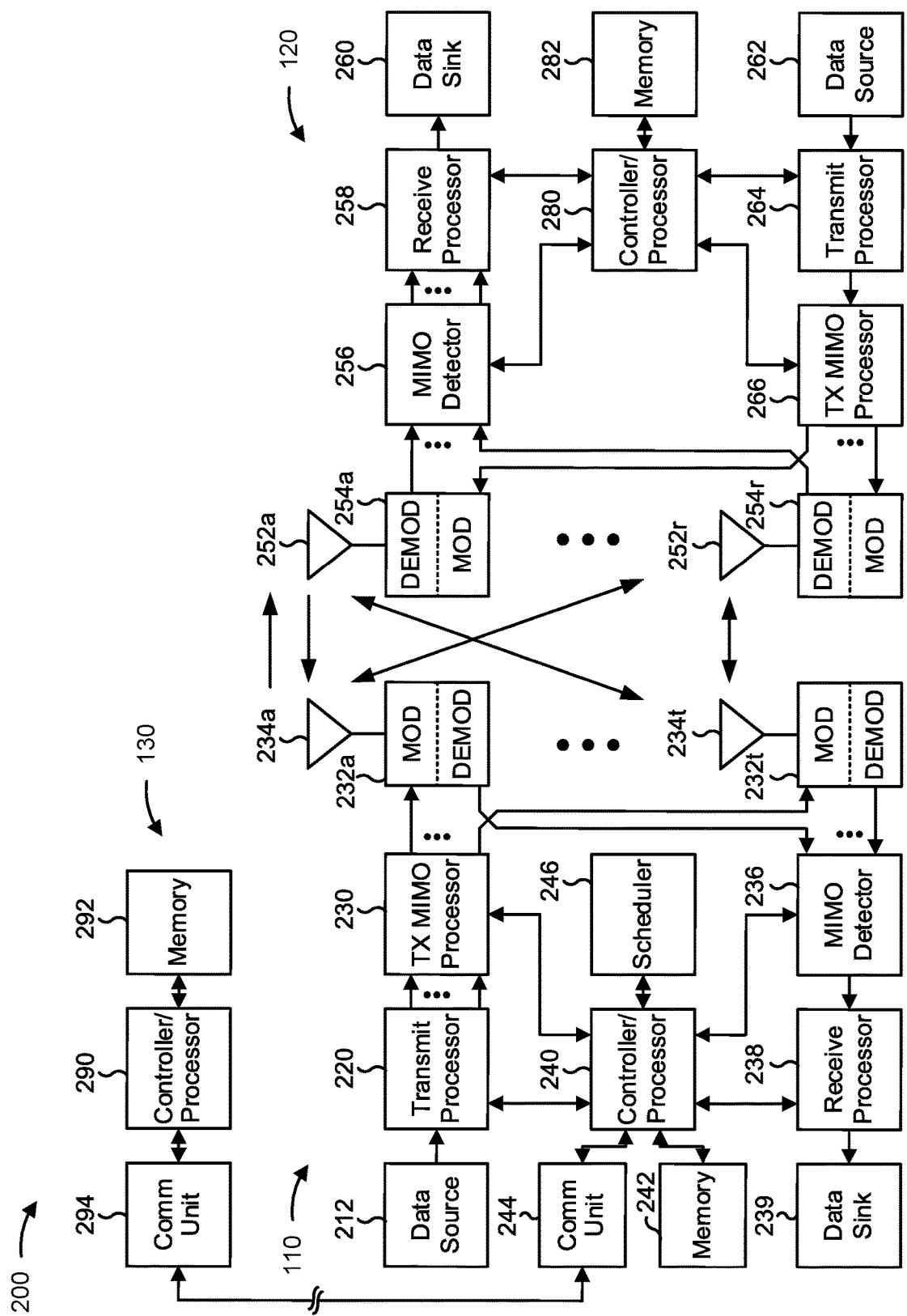
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with enabling UE 120 to originate an uplink data transmission over a dedicated preconfigured uplink resource (DPUR) while UE 120 is in an idle mode or an inactive mode, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 700 of FIG. 7, process 800 of FIG. 8, and/or other processes as described herein. A scheduler 246 may schedule UEs for data transmission on the downlink and/or uplink.

In some aspects, UE 120 may include means for receiving information related to a DPUR in a message releasing UE 120 to an idle mode or an inactive mode, wherein the information related to the DPUR identifies one or more uplink resources allocated to UE 120 to initiate an uplink data transmission in the idle mode or the inactive mode; means for transmitting, based at least in part on the information related to the DPUR, uplink data while in the idle mode or the inactive mode, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to UE 120, information related to a DPUR in a message releasing UE 120 to an idle mode or an inactive mode, wherein the information related to the DPUR identifies one or more uplink resources allocated to UE 120; means for receiving, from UE 120, uplink data while UE 120 is in the idle mode or the inactive mode, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

In some cases, a UE may be communicating in a data session in which only a small amount of data is generated in a given burst. For example, instant messaging applications often include data payloads with relatively small sizes to carry a small amount of text, low-resolution images, and/or the like. In another example, social media applications may generate notifications, updates, and/or the like that have a relatively small payload size. In still further examples, wearable devices may be used to exchange position information, small and/or low-resolution images, short voice and/or video clips, and/or the like; various applications may transmit keep-alive packets that have a small size in order to maintain a session context; and wireless sensors may transmit packets to communicate information related to changes in temperature, pressure, and/or the like. In some cases, when these small data payloads are generated, the UE may be operating in a low-power mode, such as an idle mode or an inactive mode. In addition to reducing battery consumption at the UE, the low-power mode may be associated with reduced signaling between the UE and a wireless network. However, in some cases, the UE may have to transition out of the low-power mode and into a connected mode in order to transmit and/or receive data, even if the payload size is relatively small, which can lead to increased power consumption, additional network overhead, and/or the like.

Some aspects described herein provide techniques and apparatuses for allocating or otherwise assigning a dedicated preconfigured uplink resource (DPUR) to a UE in order to enable the UE to originate a small uplink data transmission while the UE is in an idle mode, an inactive mode, and/or the like. For example, in some aspects, the small uplink data transmission may generally have a payload size that satisfies a threshold value (e.g., a maximum size such as a few kilobytes, one megabyte, a few megabytes, and/or the like), which may be configured in system information that is communicated to UEs in unicast, broadcast, multicast, and/or other suitable radio resource control (RRC) signaling, and/or the like. Furthermore, in some aspects, one or more system information blocks (SIBs) may include one or more information elements (IEs) related to small data transmission. For example, the IEs related to small data transmission may indicate a list of transmission blocks (TBs) to be used when a UE initiates a small uplink data transmission, a mobile-originated small data transmission technique, a mobile-terminated small data transmission technique, and/or the like. In general, a node in a wireless network (e.g., a base station, a core network node, and/or the like) may configure the DPUR, and information related to the DPUR may be indicated to the UE using dedicated radio resource control (RRC) signaling (e.g., an RRC release message that may include a suspend configuration (suspendConfig)) when the UE transitions from a connected mode to the idle or inactive mode, remains in and/or is otherwise released to the inactive mode after initiating a mobile-originated uplink transmission from the inactive mode, remains in and/or is otherwise released to the idle mode after initiating a mobile-originated uplink transmission from the idle mode, and/or the like.

In some aspects, the DPUR may include a dedicated random access channel (RACH) preamble, a dedicated physical uplink shared channel (PUSCH), and/or other suitable uplink resources that are allocated to the UE to enable the UE to initiate an uplink data transmission in the idle mode or the inactive mode. For example, as described in further detail elsewhere herein, a UE operating in the idle or inactive mode may initiate a contention-free uplink data transmission in Message 3 of a contention-free four-step RACH procedure, when the UE is configured with a DPUR that includes a dedicated RACH preamble. Additionally, or alternatively, a UE operating in the idle or inactive mode may initiate a contention-free uplink data transmission in Message A of a contention-free two-step RACH procedure, when the UE is configured with a DPUR that includes a dedicated RACH preamble and a dedicated PUSCH. Additionally, or alternatively, a UE operating in the inactive mode may initiate an uplink data transmission independent of any RACH procedure when the UE is configured with a DPUR that includes a dedicated PUSCH. Furthermore, in some aspects, the RRC signaling used to indicate the DPUR to the UE may further include a small data radio network temporary identifier (SD-RNTI) to be used to scramble the uplink data transmission, to schedule a hybrid automatic repeat request (HARQ) retransmission, to monitor for subsequent downlink traffic (e.g., downlink signaling or downlink data transmitted to the UE as a response to the uplink data transmission), and/or the like.

In this way, when a small uplink data transmission is triggered at one or more upper layers (e.g., an application layer and/or the like) after the UE has been released to an idle or inactive mode, the UE may utilize the DPUR to transmit the uplink data while in the idle or inactive mode and without entering a connected mode, which conserves power at the UE because the UE can remain in a low-power (e.g., idle or inactive) mode. Furthermore, enabling the UE to originate an uplink data transmission from the idle or inactive mode (without entering connected mode) reduces network and/or signaling overhead associated with transitioning the UE from the idle or inactive mode to the connected mode (or vice versa). Furthermore, by communicating information related to small data transmission in one or more SIBs, UEs can quickly acquire small data configuration information in an on-demand manner, which reduces overhead, reduces latency, improves efficiency, and/or the like.

Figure 3:
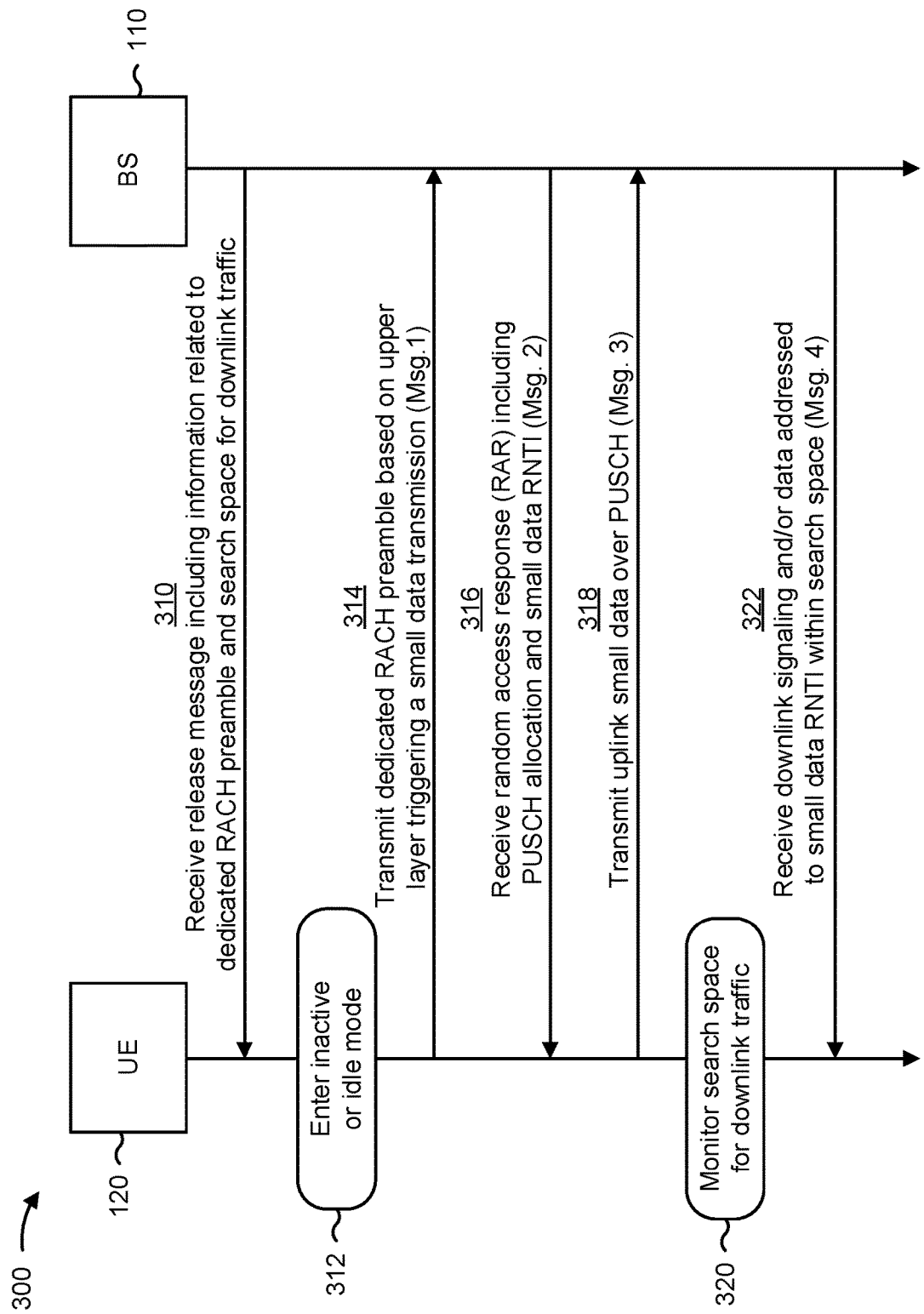
FIGS. 3-6 are diagrams illustrating example call flows enabling mobile-originated data over a dedicated preconfigured uplink resource while in an idle mode or an inactive mode, in accordance with various aspects of the present disclosure.

FIG. 3 is a diagram illustrating an example call flow 300 enabling mobile-originated data over a DPUR while in an idle mode or an inactive mode, in accordance with various aspects of the present disclosure. For example, as described in further detail herein, the example call flow 300 illustrated in FIG. 3 may enable a UE 120 to transmit uplink data to a base station 110 during a contention-free four-step RACH procedure while operating in the idle or inactive mode.

As shown in FIG. 3, and by reference number 310, the UE 120 may receive, from the base station 110, a release message that includes information related to a dedicated RACH preamble. For example, in some aspects, the dedicated RACH preamble may be configured as a one-time resource, a periodic resource that has a validity time, and/or the like, and the dedicated RACH preamble may be based on an indication from the UE 120 and/or network-side information (e.g., information related to a subscription of the UE 120, information related to local radio resource management (RRM), and/or the like). In some aspects, the dedicated RACH preamble may be associated with a single cell or base station. Additionally, or alternatively, as described in further detail elsewhere herein, the dedicated RACH preamble may be included in a DPUR list that is valid for certain areas (e.g., a list of cells, a list of base stations, a list of radio network areas (RNAs), and/or the like). In some aspects, information related to the dedicated RACH preamble may be stored at an application server, and the base station 110 may obtain the information related to the dedicated RACH preamble from the application server prior to transmitting the release message to the UE 120.

As further shown by reference number 310, the release message may include information related to a search space for downlink traffic. For example, in a physical downlink control channel (PDCCH) region in a downlink radio frame, there can be various places where a specific PDCCH is located, which may differ depending on whether the PDCCH is specific to the UE 120, common to various UEs, and/or the like. Accordingly, in some aspects, the search space indicated in the release message may indicate possible locations for a PDCCH that may carry downlink signaling (e.g., downlink control information (DCI)), downlink data addressed to the UE 120 (e.g., based on an SD-RNTI assigned to the UE 120), and/or the like.

As further shown in FIG. 3, and by reference number 312, the release message may cause the UE 120 be released to an idle mode or an inactive mode. For example, in some aspects, the release message may cause the UE 120 to transition from a connected mode to the idle mode or from the connected mode to the inactive mode. Additionally, or alternatively, the release message may cause the UE 120 to remain in the inactive mode after transmitting mobile-originated uplink data from the inactive mode. For example, prior to receiving the release message that includes the dedicated RACH preamble and/or other information related to the DPUR, the UE 120 may be operating in the inactive mode and initiate an RRC resume request, and the base station 110 may respond with the release message (which may include a suspend configuration) to cause the UE 120 to remain in the inactive mode. Additionally, or alternatively, in some aspects, the release message may cause the UE 120 to remain in the idle mode after transmitting mobile-originated uplink data from the idle mode. For example, prior to receiving the release message, the UE 120 may be operating in the idle mode and transmit an RRC resume request, an RRC early data request, an RRC setup request, and/or the like to the base station 110, which may respond with the release message to cause the UE 120 to remain in the idle mode. Furthermore, in some aspects, the dedicated RACH preamble and/or other DPUR information indicated in the release message may be valid while the UE 120 is in the idle or inactive mode, or the dedicated RACH preamble and/or other DPUR information indicated in the release message may continue to be valid if and/or when the UE 120 changes state (e.g., from the inactive mode to the idle mode).

As further shown in FIG. 3, and by reference number 314, the UE 120 may transmit the dedicated RACH preamble to the base station 110 based on an upper layer (e.g., an application layer) triggering a small data transmission (e.g., an uplink data transmission having a payload size that satisfies a threshold value, which may be indicated in RRC signaling, one or more SIBs, and/or the like). In general, the dedicated RACH preamble may be transmitted as Message 1 in a contention-free four-step RACH procedure. Accordingly, as further shown in FIG. 3, and by reference number 316, the base station 110 may transmit, and the UE 120 may receive, a random access response (RAR) message (e.g., Message 2 in the contention-free four-step RACH procedure). In some aspects, the RAR message may include a dedicated PUSCH allocation for the UE 120. In some aspects, the dedicated PUSCH allocation may be a DPUR resource that is managed in a substantially similar manner as described above with respect to the dedicated RACH preamble. For example, the dedicated PUSCH may be periodic with a validity period, a one-time resource configuration, based on a subscription of the UE 120, based on information related to local RRM, associated with a single cell or base station or a group of multiple cells or base stations, and/or the like. Furthermore, in some aspects, the RAR message may include a small data RNTI (SD-RNTI) that the UE 120 is to use to scramble the uplink data transmission, schedule a HARQ retransmission, receive downlink traffic, and/or the like.

As further shown in FIG. 3, and by reference number 318, the UE 120 may transmit the uplink small data over the dedicated PUSCH as Message 3 in the contention-free four-step RACH procedure, and the UE 120 may scramble the uplink small data using the SD-RNTI provided in the RAR message. In some aspects, the uplink small data may be transmitted with RRC signaling (e.g., an RRC resume request, an RRC early data request, an RRC setup request, and/or the like). Additionally, or alternatively, the uplink small data may be transmitted without RRC signaling. For example, the uplink small data may be transmitted with a resume identifier and an authentication token for the UE 120, which may be contained in a Medium Access Control (MAC) Control Element (MAC-CE). As further shown in FIG. 3, and by reference number 320, the UE 120 may monitor the search space indicated in the previous release message for downlink traffic (e.g., downlink signaling, downlink user plane data, and/or the like). For example, in some aspects, the UE 120 may monitor the search space for downlink traffic that is addressed to the SD-RNTI assigned to the UE 120 and indicated in the RAR message. As further shown in FIG. 3, and by reference number 322, the UE 120 may receive the downlink signaling and/or downlink data addressed to the SD-RNTI as Message 4 in the contention-free four-step RACH procedure. In general, the downlink signaling provided in Message 4 may include RRC signaling, such as an RRC resume message, an RRC release message, and/or the like, that causes the UE 120 to enter and/or remain in the inactive or idle mode. In this way, the UE 120 may use the DPUR including the dedicated RACH preamble provided in the initial release message to initiate the contention-free four-step RACH procedure and subsequently transmit uplink data in Message 3 of the contention-free four-step RACH procedure (using the dedicated PUSCH allocation received in Message 2) without entering connected mode.

As indicated above, FIG. 3 is provided as an example. Other examples may differ from what is described with respect to FIG. 3.

Figure 4:
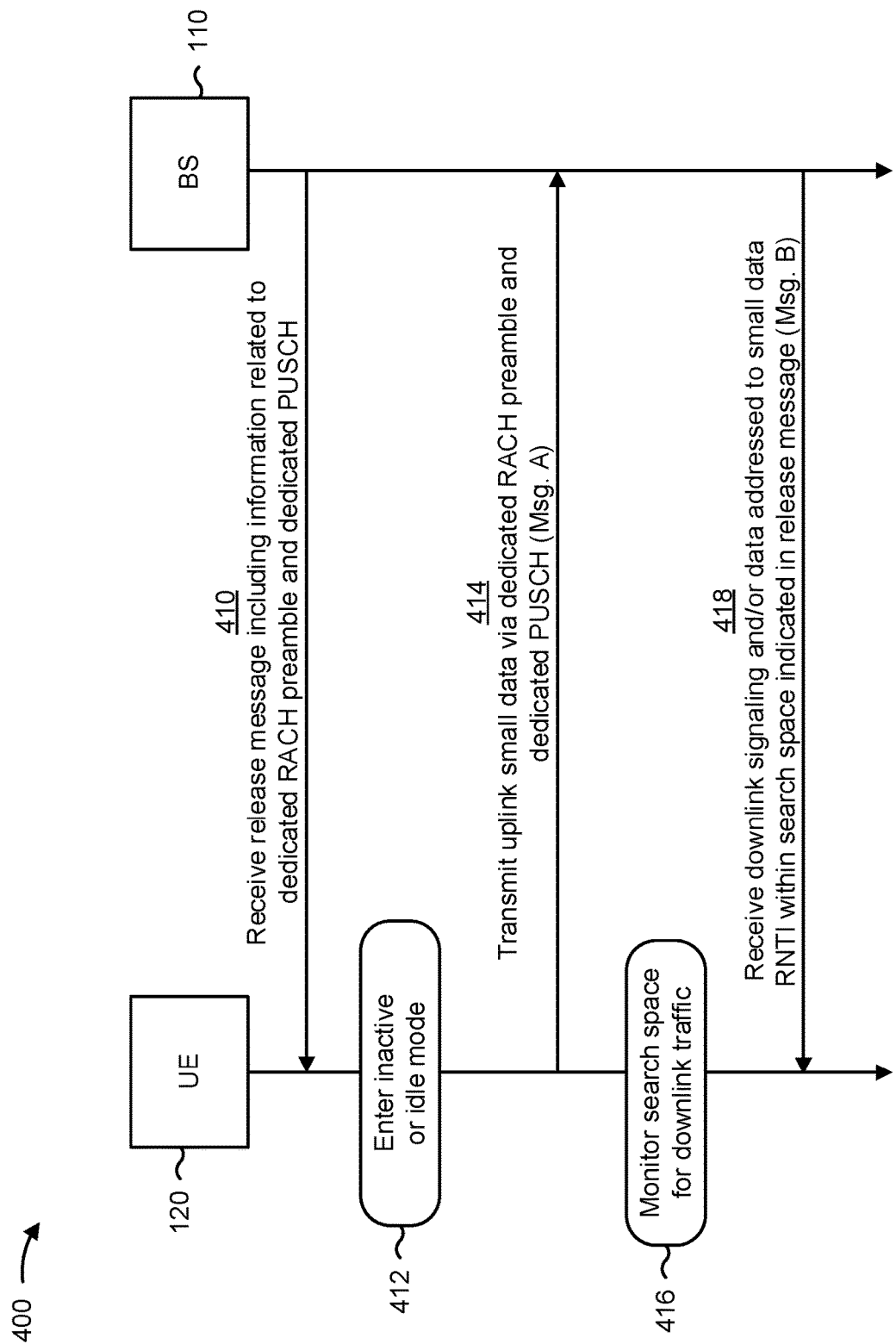

FIG. 4 is a diagram illustrating an example call flow 400 enabling mobile-originated data over a DPUR while in an idle mode or an inactive mode, in accordance with various aspects of the present disclosure. For example, as described in further detail herein, the example call flow 400 illustrated in FIG. 4 may enable a UE 120 to transmit uplink data to a base station 110 during a contention-free two-step RACH procedure while operating in the idle or inactive mode.

As shown in FIG. 4, and by reference number 410, the UE 120 may receive, from the base station 110, a release message that includes a DPUR configuration assigned to the UE 120. For example, as shown, the DPUR configuration may include information related to a dedicated RACH preamble and a dedicated PUSCH assigned to the UE 120. For example, in some aspects, the dedicated RACH preamble and the dedicated PUSCH may be configured as one-time resources, periodic resources that have a validity time, and/or the like, and the DPUR configuration that includes the dedicated RACH preamble and the dedicated PUSCH may be based on an indication from the UE 120 and/or network-side information (e.g., information related to a subscription of the UE 120, information related to local RRM, and/or the like). In some aspects, the DPUR configuration may be associated with a single cell or base station. Additionally, or alternatively, as described in further detail elsewhere herein, the DPUR configuration may be included in a DPUR configuration list that is valid for certain areas. In some aspects, information related to the DPUR configuration may be stored at an application server, and the base station 110 may obtain the information related to the DPUR configuration from the application server prior to transmitting the release message to the UE 120. Furthermore, in some aspects, the release message provided to the UE may further include information related to a search space for downlink traffic and an SD-RNTI that the UE 120 is to use to scramble the uplink data transmission, schedule a HARQ retransmission, receive downlink traffic, and/or the like.

As further shown in FIG. 4, and by reference number 412, the release message may cause the UE 120 be released to an idle mode or an inactive mode. For example, as described in more detail elsewhere herein, the release message may cause the UE 120 to be released to the idle or inactive mode from a connected mode, from the inactive mode, from the idle mode, and/or the like. Furthermore, in some aspects, the DPUR configuration indicated in the release message may be valid while the UE 120 is in the idle or inactive mode, or the DPUR configuration indicated in the release message may continue to be valid if and/or when the UE 120 changes state (e.g., from the inactive mode to the idle mode).

As further shown in FIG. 4, and by reference number 414, the UE 120 may use the dedicated RACH preamble to transmit the uplink small data over the dedicated PUSCH as Message A in the contention-free two-step RACH procedure. For example, in some aspects, the uplink small data may be transmitted based on an upper layer triggering a small data transmission having a payload size that satisfies a threshold value. In some aspects, the uplink small data may be transmitted with RRC signaling (e.g., an RRC resume request, an RRC early data request, an RRC setup request, and/or the like). Additionally, or alternatively, the uplink small data may be transmitted without RRC signaling. For example, the uplink small data may be transmitted with an identifier and an authentication token associated with the UE 120, which may be contained in a MAC-CE. As further shown in FIG. 4, and by reference number 416, the UE 120 may monitor the search space indicated in the previous release message for downlink traffic that is addressed to the SD-RNTI assigned to the UE 120. As further shown in FIG. 4, and by reference number 418, the UE 120 may receive the downlink signaling and/or downlink data addressed to the SD-RNTI as Message B in the contention-free two-step RACH procedure. In general, the downlink signaling provided in Message B may include RRC signaling such as an RRC resume message, an RRC release message, and/or the like that causes the UE 120 to enter and/or remain in the inactive or idle mode. In this way, the UE 120 may use the DPUR including the dedicated RACH preamble and the dedicated PUSCH provided in the initial release message to originate an uplink data transmission via the contention-free two-step RACH procedure (e.g., subject to a maximum size limit for the uplink data transmission) while in the inactive or idle mode and without entering a connected mode.

As indicated above, FIG. 4 is provided as an example. Other examples may differ from what is described with respect to FIG. 4.

Figure 5:
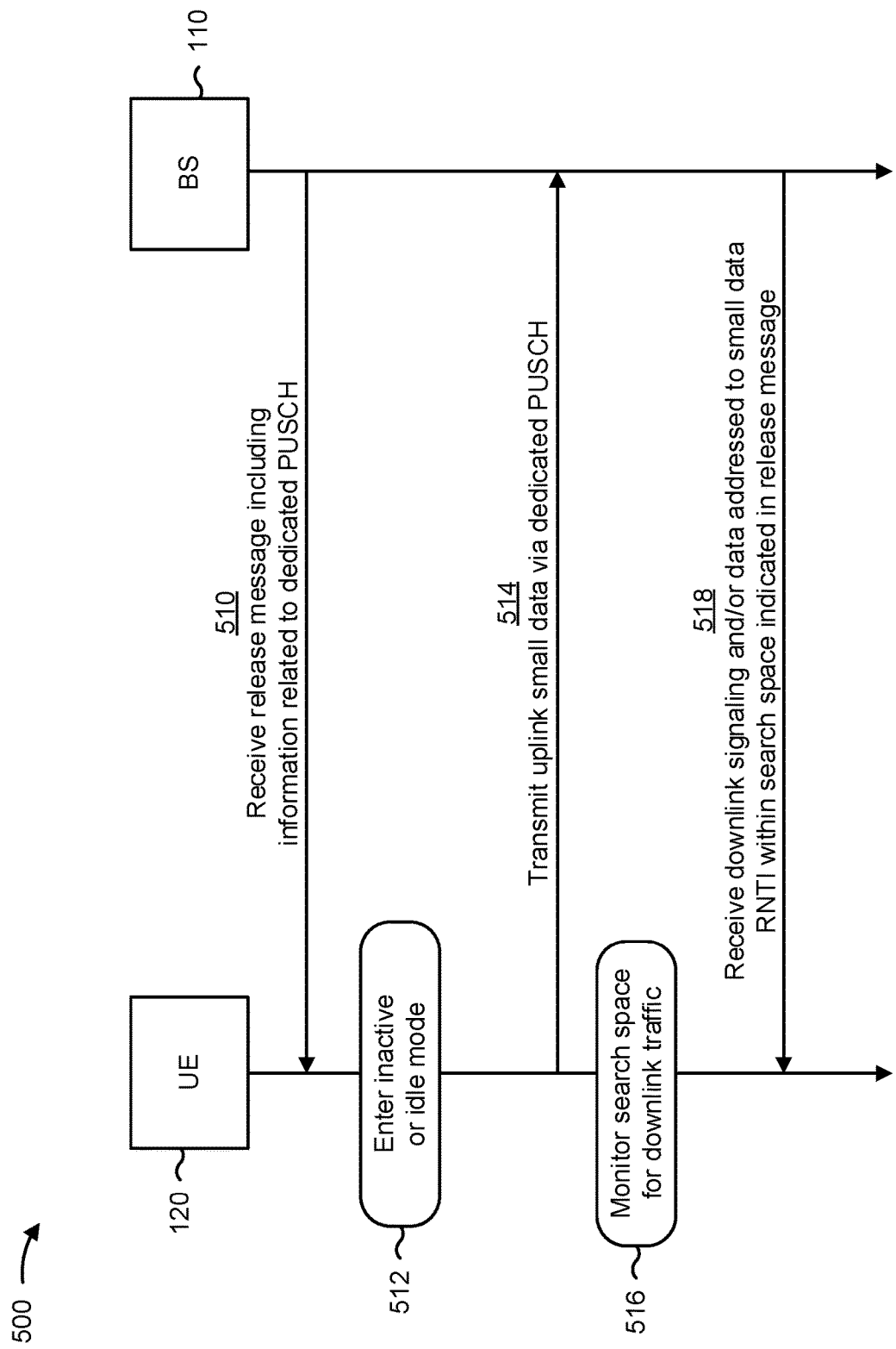

FIG. 5 is a diagram illustrating an example call flow 500 enabling mobile-originated data over a DPUR while in an idle mode or an inactive mode, in accordance with various aspects of the present disclosure. For example, as described in further detail herein, the example call flow 500 illustrated in FIG. 5 may enable a UE 120 to transmit uplink data to a base station 110 over a dedicated PUSCH while operating in the idle or inactive mode and independent of any RACH procedure.

As shown in FIG. 5, and by reference number 510, the UE 120 may receive, from the base station 110, a release message that includes a DPUR configuration assigned to the UE 120. For example, as shown, the DPUR configuration may include information related to a dedicated PUSCH assigned to the UE 120. For example, in some aspects, the dedicated PUSCH may be configured as a one-time resource, a periodic resource that has a validity time, and/or the like, as described in further detail elsewhere herein. Furthermore, in some aspects, the release message provided to the UE may further include information related to a search space for downlink traffic and an SD-RNTI that the UE 120 is to use to scramble the uplink data transmission, schedule a HARQ retransmission, receive downlink traffic, and/or the like.

As further shown in FIG. 5, and by reference number 512, the release message may cause the UE 120 be released to an idle mode or an inactive mode. For example, as described in more detail elsewhere herein, the release message may cause the UE 120 to be released to the idle or inactive mode from a connected mode, from the inactive mode, from the idle mode, and/or the like. Furthermore, in some aspects, the DPUR configuration indicated in the release message may be valid while the UE 120 is in the idle or inactive mode, or the DPUR configuration indicated in the release message may continue to be valid if and/or when the UE 120 changes state (e.g., from the inactive mode to the idle mode).

As further shown in FIG. 5, and by reference number 514, the UE 120 may transmit the uplink small data to the base station 110 over the dedicated PUSCH (e.g., independent of a RACH procedure). For example, in some aspects, the uplink small data may be transmitted based on an upper layer triggering a small data transmission having a payload size that satisfies a threshold value. In some aspects, the uplink small data may be transmitted with RRC signaling (e.g., an RRC resume request, an RRC early data request, an RRC setup request, and/or the like). Additionally, or alternatively, the uplink small data may be transmitted with a MAC-CE that includes an identifier and an authentication token associated with the UE 120. As further shown in FIG. 5, and by reference number 516, the UE 120 may monitor the search space indicated in the previous release message for downlink traffic that is addressed to the SD-RNTI assigned to the UE 120. As further shown in FIG. 5, and by reference number 518, the UE 120 may receive the downlink signaling that causes the UE 120 to enter and/or remain in the inactive or idle mode. Additionally, or alternatively, in some aspects, the downlink traffic that is addressed to the SD-RNTI for the UE 120 may include downlink data that is transmitted as a response to the uplink small data transmission from the UE 120. In this way, the UE 120 may use the DPUR including the dedicated PUSCH provided in the initial release message to originate an uplink data transmission (e.g., subject to a maximum size limit for the uplink data transmission) while in the inactive or idle mode and without having to enter a connected mode or communicate signaling messages associated with a two-step or four-step RACH procedure.

As indicated above, FIG. 5 is provided as an example. Other examples may differ from what is described with respect to FIG. 5.

Figure 6:
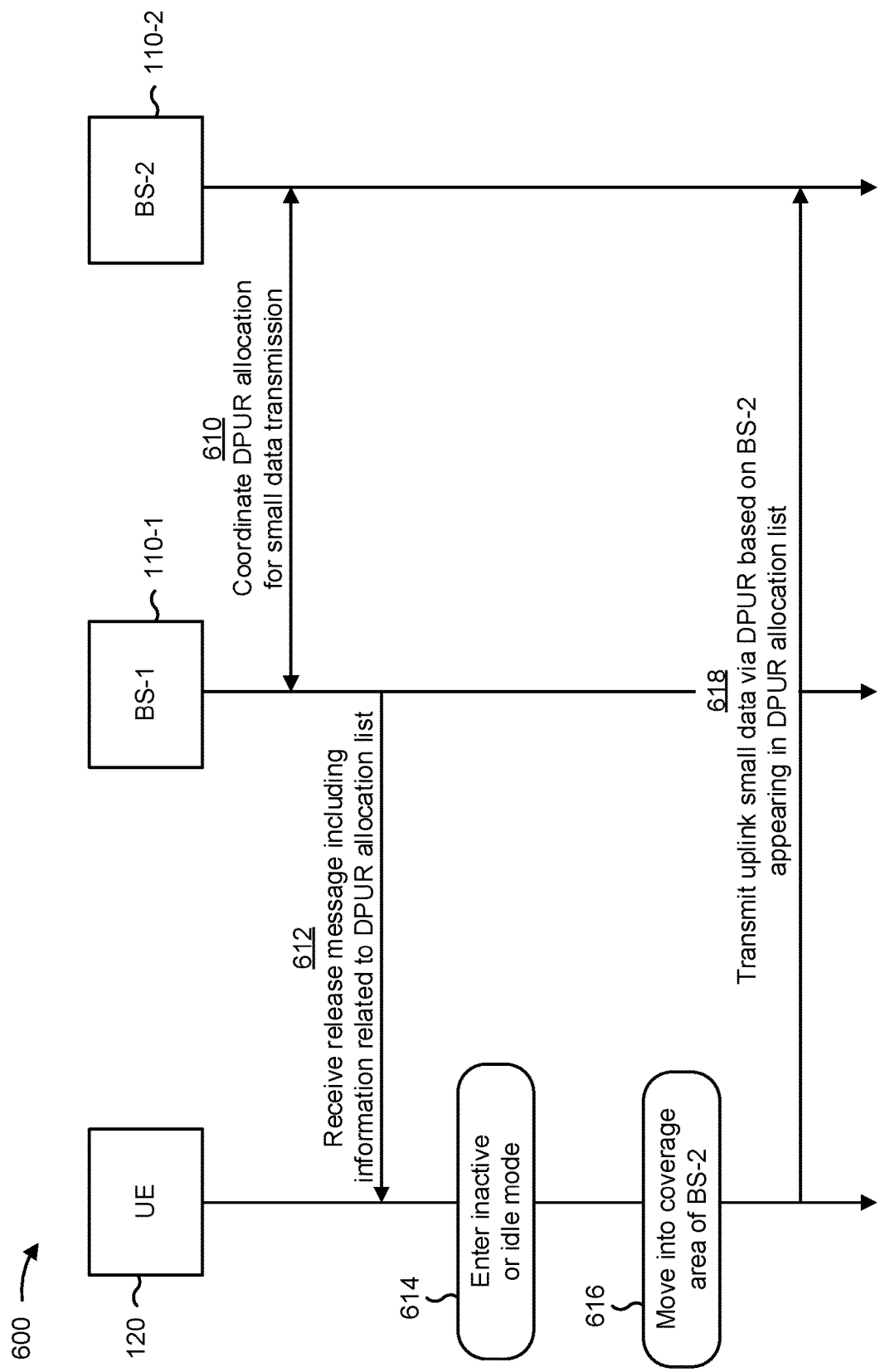

FIG. 6 is a diagram illustrating an example call flow 600 enabling mobile-originated data over a DPUR while in an idle mode or an inactive mode, in accordance with various aspects of the present disclosure. For example, as described in further detail herein, the example call flow 600 illustrated in FIG. 6 may enable a DPUR configuration to be coordinated across multiple cells, base stations, radio network areas (RNAs), and/or the like, which may enable a UE 120 to transmit uplink data to any one or more of multiple base stations 110-1, 110-2, and/or the like (e.g., to support mobility scenarios in which an uplink small data transmission may be triggered after the UE 120 moves from the coverage area of one base station, such as base station 110-1, to the coverage area of another base station, such as base station 110-2).

For example, as shown in FIG. 6, and by reference number 610, a group of base stations including base station 110-1, base station 110-2, and/or other base stations in a coordination group may coordinate a DPUR allocation for small data transmissions. For example, the coordination group can include a group of cells, a group of base stations, a group of RNAs, and/or the like, and each cell, base station, RNA, and/or the like may configure one or more DPUR allocations and SD-RNTIs for UEs 120 that are operating in the inactive mode within a corresponding coverage area. For example, in the call flow 600 shown in FIG. 6, base station 110-1 may transmit a DPUR reservation request to base station 110-2 to preconfigure certain uplink resources (e.g., a dedicated RACH preamble, a dedicated PUSCH, and/or the like) prior to releasing a UE 120 to an idle or inactive mode. Accordingly, in some aspects, base station 110-1 may receive, from base station 110-2, a DPUR reservation response that includes information related to one or more dedicated RACH preambles, dedicated PUSCH allocations, SD-RNTIs, and/or other resources that have been reserved and allocated to small data transmissions.

As further shown in FIG. 6, and by reference number 612, base station 110-1 may transmit, and UE 120 may receive, a release message that includes information related to a DPUR allocation list. For example, the DPUR allocation list may include a list of dedicated RACH preambles, dedicated PUSCH allocations, SD-RNTIs, and/or the like, which may be associated with a list of cells, a list of base stations, a list of RNAs, and/or the like. As further shown in FIG. 6, and by reference number 614, the release message may cause the UE 120 to be released to the inactive or idle mode, as described in more detail elsewhere herein.

As further shown in FIG. 6, and by reference number 616, the UE 120 may move from the coverage area of base station 110-1 and into the coverage area of another base station, such as base station 110-2. In some aspects, based at least in part on one or more upper layers triggering an uplink small data transmission, the UE 120 may check the DPUR allocation list to determine whether the current serving base station appears in the DPUR allocation list or is otherwise associated with one or more of the cells, RNAs, and/or the like indicated in the DPUR allocation list. Accordingly, as shown in FIG. 6, and by reference number 618, the UE 120 may transmit the uplink small data transmission via the DPUR associated with the base station 110-2 (e.g., the DPUR associated with the cell provided by the base station 110-2) based at least in part on the base station 110-2 appearing in the DPUR allocation list. For example, where the DPUR associated with the base station 110-2 includes only a dedicated RACH preamble, the UE 120 may initiate the uplink small data transmission via the contention-free four-step RACH procedure described in further detail above with respect to FIG. 3. Additionally, or alternatively, where the DPUR associated with the base station 110-2 includes a dedicated RACH preamble and a dedicated PUSCH, the UE 120 may initiate the uplink small data transmission via the contention-free two-step RACH procedure described in further detail above with respect to FIG. 4. Additionally, or alternatively, where the DPUR associated with the base station 110-2 includes a dedicated PUSCH only, the UE 120 may initiate the uplink small data transmission independent of any RACH procedure, as described in further detail above with respect to FIG. 5.

As indicated above, FIG. 6 is provided as an example. Other examples may differ from what is described with respect to FIG. 6.

Figure 7:
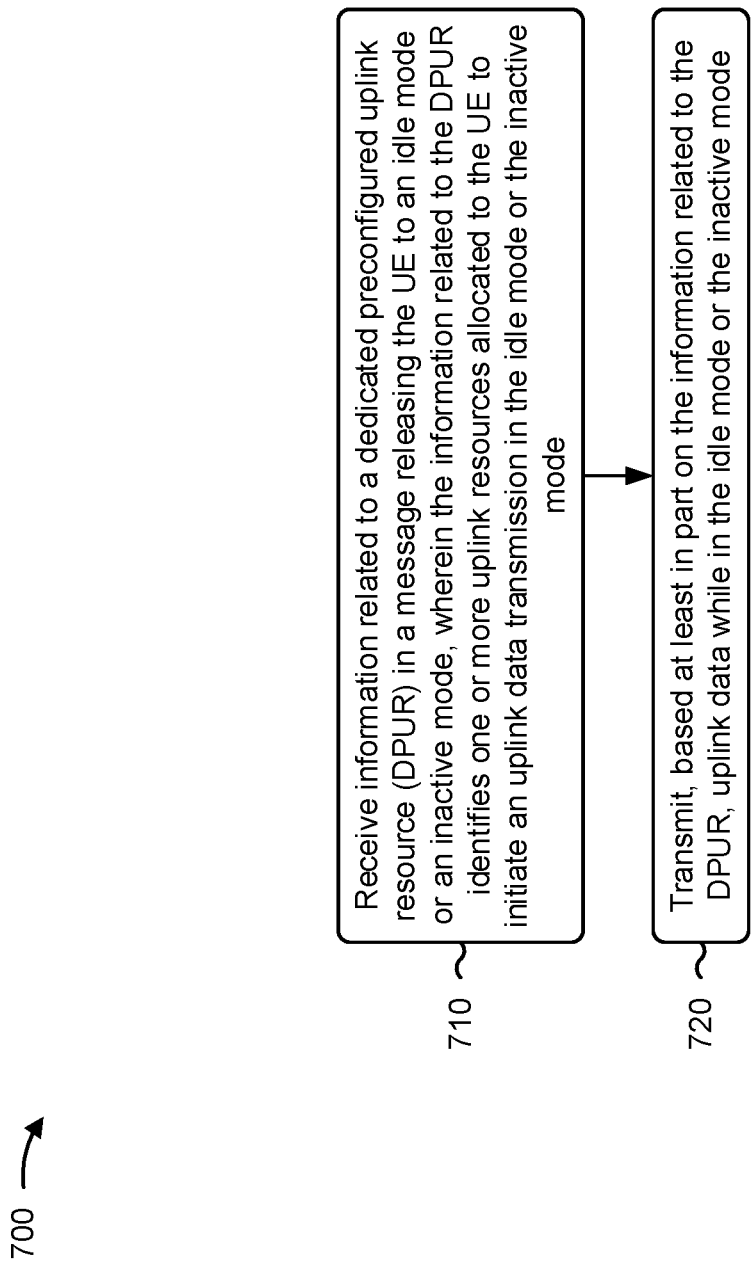
FIG. 7 is a diagram illustrating an example process performed, for example, by a user equipment, in accordance with various aspects of the present disclosure.

FIG. 7 is a diagram illustrating an example process 700 performed, for example, by a UE, in accordance with various aspects of the present disclosure. Example process 700 is an example where a UE (e.g., UE 120 and/or the like) performs operations to originate an uplink data transmission over a DPUR while in an idle mode or an inactive mode.

As shown in FIG. 7, in some aspects, process 700 may include receiving information related to a DPUR in a message releasing the UE to an idle mode or an inactive mode, wherein the information related to the DPUR identifies one or more uplink resources allocated to the UE to initiate an uplink data transmission in the idle mode or the inactive mode (block 710). For example, the UE may receive (e.g., using antenna 252, DEMOD 254, MIMO detector 256, receive processor 258, controller/processor 280, and/or the like) information related to a DPUR in a message releasing the UE to an idle mode or an inactive mode, as described above. In some aspects, the information related to the DPUR identifies one or more uplink resources allocated to the UE to initiate an uplink data transmission in the idle mode or the inactive mode.

As further shown in FIG. 7, in some aspects, process 700 may include transmitting, based at least in part on the information related to the DPUR, uplink data while in the idle mode or the inactive mode (block 720). For example, the UE may transmit (e.g., using controller/processor 280, transmit processor 264, TX MIMO processor 266, MOD 254, antenna 252, and/or the like), based at least in part on the information related to the DPUR, uplink data while in the idle mode or the inactive mode, as described above.

Process 700 may include additional aspects, such as any single aspect or any combination of aspects described below and/or in connection with one or more other processes described elsewhere herein.

In a first aspect, the one or more uplink resources allocated to the UE include a dedicated preamble.

In a second aspect, alone or in combination with the first aspect, the UE transmits the dedicated preamble in a first message of a four-step RACH procedure and receives a PUSCH allocation in a second message of the four-step RACH procedure, and the UE transmits the uplink data over the PUSCH in a third message of the four-step RACH procedure.

In a third aspect, alone or in combination with one or more of the first and second aspects, the second message of the four-step RACH procedure further includes an RNTI used to scramble the uplink data transmitted over the PUSCH.

In a fourth aspect, alone or in combination with one or more of the first through third aspects, the UE monitors a search space identified in the message releasing the UE to the idle mode or the inactive mode for downlink data addressed to the RNTI; receives, within the search space, the downlink data in a fourth message of the four-step RACH procedure; and the downlink data includes one or more of downlink user plane data in response to the uplink data, or downlink signaling releasing the UE to the idle mode or the inactive mode.

In a fifth aspect, alone or in combination with one or more of the first through fourth aspects, the four-step RACH procedure is a contention-free four-step RACH procedure.

In a sixth aspect, alone or in combination with one or more of the first through fifth aspects, the one or more uplink resources allocated to the UE further include a dedicated PUSCH.

In a seventh aspect, alone or in combination with one or more of the first through sixth aspects, the uplink data is transmitted over the dedicated PUSCH using the dedicated preamble in a first message of a two-step RACH procedure.

In an eighth aspect, alone or in combination with one or more of the first through seventh aspects, the message releasing the UE to the idle mode or the inactive mode further includes an RNTI used to scramble the uplink data transmitted over the PUSCH.

In a ninth aspect, alone or in combination with one or more of the first through eighth aspects, the UE monitors a search space identified in the message releasing the UE to the idle mode or the inactive mode for downlink data addressed to the RNTI; receives, within the search space, the downlink data in a second message of the two-step RACH procedure; and the downlink data includes one or more of downlink user plane data in response to the uplink data, or downlink signaling releasing the UE to the idle mode or the inactive mode.

In a tenth aspect, alone or in combination with one or more of the first through ninth aspects, the two-step RACH procedure is a contention-free two-step RACH procedure.

In an eleventh aspect, alone or in combination with one or more of the first through tenth aspects, the one or more uplink resources allocated to the UE include a dedicated PUSCH.

In a twelfth aspect, alone or in combination with one or more of the first through eleventh aspects, the uplink data is transmitted over the dedicated PUSCH while the UE is in the inactive mode.

In a thirteenth aspect, alone or in combination with one or more of the first through twelfth aspects, the UE receives, within a search space identified in the message releasing the UE to the idle mode or the inactive mode, downlink data addressed to an RNTI used to scramble the uplink data, and the downlink data includes one or more of downlink user plane data in response to the uplink data, or downlink signaling releasing the UE to the idle mode or the inactive mode.

In a fourteenth aspect, alone or in combination with one or more of the first through thirteenth aspects, the information related to the DPUR includes a list of cells associated with the one or more uplink resources allocated to the UE.

In a fifteenth aspect, alone or in combination with one or more of the first through fourteenth aspects, the uplink data is transmitted further based at least in part on the UE detecting a base station associated with at least one cell in the list of cells associated with the one or more uplink resources allocated to the UE.

In a sixteenth aspect, alone or in combination with one or more of the first through fifteenth aspects, the message including the information related to the DPUR causes the UE to one or more of transition from a connected mode to the inactive mode, remain in the inactive mode, transition from the connected mode to the idle mode, or remain in the idle mode.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
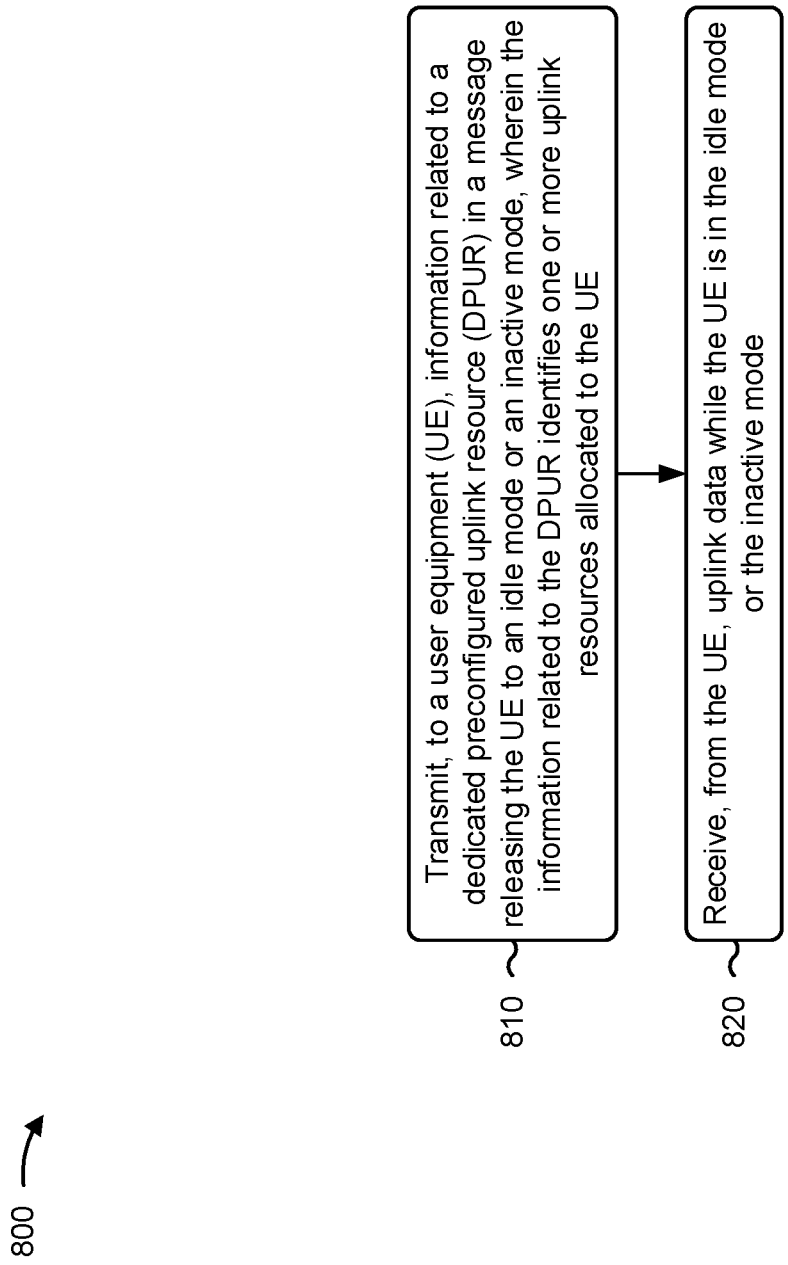
FIG. 8 is a diagram illustrating an example process performed, for example, by a base station, in accordance with various aspects of the present disclosure.

FIG. 8 is a diagram illustrating an example process 800 performed, for example, by a base station, in accordance with various aspects of the present disclosure. Example process 800 is an example where a base station (e.g., base station 110 and/or the like) performs operations related to a UE originating an uplink data transmission over a DPUR while in an idle mode or an inactive mode.

As shown in FIG. 8, in some aspects, process 800 may include transmitting, to a UE, information related to a DPUR in a message releasing the UE to an idle mode or an inactive mode, wherein the information related to the DPUR identifies one or more uplink resources allocated to the UE (block 810). For example, the base station may transmit (e.g., using controller/processor 240, transmit processor 220, TX MIMO processor 230, MOD 232, antenna 234, and/or the like), to a UE, information related to a DPUR in a message releasing the UE to an idle mode or an inactive mode, as described above. In some aspects, the information related to the DPUR identifies one or more uplink resources allocated to the UE.

As further shown in FIG. 8, in some aspects, process 800 may include receiving, from the UE, uplink data while the UE is in the idle mode or the inactive mode (block 820). For example, the base station may receive (e.g., using antenna 234, DEMOD 232, MIMO detector 236, receive processor 238, controller/processor 240, and/or the like), from the UE, uplink data while the UE is in the idle mode or the inactive mode, as described above.

Process 800 may include additional aspects, such as any single aspect or any combination of aspects described below and/or in connection with one or more other processes described elsewhere herein.

In a first aspect, the one or more uplink resources allocated to the UE include a dedicated preamble.

In a second aspect, alone or in combination with the first aspect, the base station receives the dedicated preamble from the UE in a first message of a four-step RACH procedure, transmits, to the UE, a PUSCH allocation in a second message of the four-step RACH procedure, and the uplink data is received over the PUSCH in a third message of the four-step RACH procedure.

In a third aspect, alone or in combination with one or more of the first and second aspects, the second message of the four-step RACH procedure further includes an RNTI to be used to scramble the uplink data transmitted over the PUSCH.

In a fourth aspect, alone or in combination with one or more of the first through third aspects, the base station transmits, within a search space identified in the message releasing the UE to the idle mode or the inactive mode, downlink data addressed to the RNTI in a fourth message of the four-step RACH procedure, and the downlink data includes one or more of downlink user plane data in response to the uplink data or downlink signaling releasing the UE to the idle mode or the inactive mode.

In a fifth aspect, alone or in combination with one or more of the first through fourth aspects, the four-step RACH procedure is a contention-free four-step RACH procedure.

In a sixth aspect, alone or in combination with one or more of the first through fifth aspects, the one or more uplink resources allocated to the UE further include a dedicated PUSCH.

In a seventh aspect, alone or in combination with one or more of the first through sixth aspects, the uplink data is received over the dedicated PUSCH in a first message using the dedicated preamble in a two-step RACH procedure.

In an eighth aspect, alone or in combination with one or more of the first through seventh aspects, the message releasing the UE to the idle mode or the inactive mode further includes an RNTI to be used to scramble the uplink data transmitted over the PUSCH.

In a ninth aspect, alone or in combination with one or more of the first through eighth aspects, the base station transmits, within a search space identified in the message releasing the UE to the idle mode or the inactive mode, downlink data addressed to the RNTI in a second message of the two-step RACH procedure, and the downlink data includes one or more of downlink user plane data in response to the uplink data or downlink signaling releasing the UE to the idle mode or the inactive mode.

In a tenth aspect, alone or in combination with one or more of the first through ninth aspects, the two-step RACH procedure is a contention-free two-step RACH procedure.

In an eleventh aspect, alone or in combination with one or more of the first through tenth aspects, the one or more uplink resources allocated to the UE include a dedicated PUSCH.

In a twelfth aspect, alone or in combination with one or more of the first through eleventh aspects, the uplink data is received over the dedicated PUSCH while the UE is in the inactive mode.

In a thirteenth aspect, alone or in combination with one or more of the first through twelfth aspects, the base station transmits, within a search space identified in the message releasing the UE to the idle mode or the inactive mode, downlink data addressed to an RNTI used to scramble the uplink data, and the downlink data includes one or more of downlink user plane data in response to the uplink data or downlink signaling releasing the UE to the idle mode or the inactive mode.

In a fourteenth aspect, alone or in combination with one or more of the first through thirteenth aspects, the information related to the DPUR includes a list of cells associated with the one or more uplink resources allocated to the UE.

In a fifteenth aspect, alone or in combination with one or more of the first through fourteenth aspects, the uplink data is received from the UE based at least in part on the base station being associated with at least one cell in the list of cells associated with the one or more uplink resources allocated to the UE.

In a sixteenth aspect, alone or in combination with one or more of the first through fifteenth aspects, the message including the information related to the DPUR causes the UE to one or more of transition from a connected mode to the inactive mode, remain in the inactive mode, transition from the connected mode to the idle mode, or remain in the idle mode.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a message, that releases the UE to an idle mode or an inactive mode, including:
      information related to a dedicated preconfigured uplink resource (DPUR), and
      a small data radio network temporary identifier (RNTI) used to scramble uplink data,
   wherein the information related to the DPUR identifies one or more uplink resources allocated to the UE to initiate an uplink data transmission in the idle mode or the inactive mode;
   monitoring a search space, associated with small data traffic, identified in the message releasing the UE to the idle mode or the inactive mode for downlink data addressed to the small data RNTI; and
   transmitting, based at least in part on the information related to the DPUR, uplink data while in the idle mode or the inactive mode.

2. The method of claim 1, wherein the one or more uplink resources allocated to the UE include a dedicated preamble.

3. The method of claim 2, further comprising:
   transmitting the dedicated preamble in a first message of a four-step random access channel (RACH) procedure; and
   receiving a physical uplink shared channel (PUSCH) allocation in a second message of the four-step RACH procedure, wherein the uplink data is transmitted over a PUSCH in a third message of the four-step RACH procedure.

4. The method of claim 3, further comprising:
receiving, within the search space, the downlink data in a fourth message of the four-step RACH procedure, wherein the downlink data includes one or more of downlink user plane data in response to the uplink data or downlink signaling releasing the UE to the idle mode or the inactive mode.

5. The method of claim 2, wherein the one or more uplink resources allocated to the UE further include a dedicated physical uplink shared channel (PUSCH).

6. The method of claim 5, wherein the uplink data is transmitted over the dedicated PUSCH using the dedicated preamble in a first message of a two-step random access channel (RACH) procedure.

7. The method of claim 6, further comprising:
receiving, within the search space, the downlink data in a second message of the two-step RACH procedure, wherein the downlink data includes one or more of downlink user plane data in response to the uplink data or downlink signaling releasing the UE to the idle mode or the inactive mode.

8. The method of claim 1, wherein the one or more uplink resources allocated to the UE include a dedicated physical uplink shared channel (PUSCH).

9. The method of claim 8, wherein the uplink data is transmitted over the dedicated PUSCH while the UE is in the inactive mode.

10. The method of claim 8, further comprising:
receiving the downlink data addressed to the small data RNTI, wherein the downlink data includes one or more of downlink user plane data in response to the uplink data or downlink signaling releasing the UE to the idle mode or the inactive mode.

11. The method of claim 1, wherein the information related to the DPUR includes a list of cells associated with the one or more uplink resources allocated to the UE.

12. The method of claim 11, wherein the uplink data is transmitted further based at least in part on the UE detecting a base station associated with at least one cell in the list of cells associated with the one or more uplink resources allocated to the UE.

13. The method of claim 1, wherein the message including the information related to the DPUR causes the UE to one or more of transition from a connected mode to the inactive mode, remain in the inactive mode, transition from the connected mode to the idle mode, or remain in the idle mode.

14. A method of wireless communication performed by a network entity, comprising:
transmitting a message, that releases a user equipment (UE) to an idle mode or an inactive mode, including:
information related to a dedicated preconfigured uplink resource (DPUR),
a small data radio network temporary identifier (RNTI) used to scramble uplink data, and
an identification of a search space, associated with small data traffic, the UE is to monitor for downlink data addressed to the small data RNTI,
wherein the information related to the DPUR identifies one or more uplink resources allocated to the UE; and
receiving uplink data while the UE is in the idle mode or the inactive mode.

15. The method of claim 14, wherein the one or more uplink resources allocated to the UE include a dedicated preamble.

16. The method of claim 15, further comprising:
receiving the dedicated preamble from the UE in a first message of a four-step random access channel (RACH) procedure; and
transmitting, to the UE, a physical uplink shared channel (PUSCH) allocation in a second message of the four-step RACH procedure, wherein the uplink data is received over a PUSCH in a third message of the four-step RACH procedure.

17. The method of claim 16, further comprising:
transmitting, within the search space identified in the message releasing the UE to the idle mode or the inactive mode, the downlink data addressed to the small data RNTI in a fourth message of the four-step RACH procedure, wherein the downlink data includes one or more of downlink user plane data in response to the uplink data or downlink signaling releasing the UE to the idle mode or the inactive mode.

18. The method of claim 15, wherein the one or more uplink resources allocated to the UE further include a dedicated physical uplink shared channel (PUSCH).

19. The method of claim 18, wherein the uplink data is received over the dedicated PUSCH in a first message using the dedicated preamble in a two-step random access channel (RACH) procedure.

20. The method of claim 19, further comprising:
transmitting, within the search space identified in the message releasing the UE to the idle mode or the inactive mode, the downlink data addressed to the small data RNTI in a second message of the two-step RACH procedure, wherein the downlink data includes one or more of downlink user plane data in response to the uplink data or downlink signaling releasing the UE to the idle mode or the inactive mode.

21. The method of claim 14, wherein the one or more uplink resources allocated to the UE include a dedicated physical uplink shared channel (PUSCH).

22. The method of claim 21, wherein the uplink data is received over the dedicated PUSCH while the UE is in the inactive mode.

23. The method of claim 21, further comprising:
transmitting, within the search space identified in the message releasing the UE to the idle mode or the inactive mode, the downlink data addressed to the small data RNTI, wherein the downlink data includes one or more of downlink user plane data in response to the uplink data or downlink signaling releasing the UE to the idle mode or the inactive mode.

24. The method of claim 14, wherein the information related to the DPUR includes a list of cells associated with the one or more uplink resources allocated to the UE.

25. The method of claim 24, wherein the uplink data is received from the UE based at least in part on the network entity being associated with at least one cell in the list of cells associated with the one or more uplink resources allocated to the UE.

26. The method of claim 14, wherein the message including the information related to the DPUR causes the UE to one or more of transition from a connected mode to the inactive mode, remain in the inactive mode, transition from the connected mode to the idle mode, or remain in the idle mode.

27. A user equipment (UE) for wireless communication, comprising:
a memory; and
one or more processors, coupled with the memory, configured to:
receive a message, that releases the UE to an idle mode or an inactive mode, including:
information related to a dedicated preconfigured uplink resource (DPUR), and
a small data radio network temporary identifier (RNTI) used to scramble uplink data,
wherein the information related to the DPUR identifies one or more uplink resources allocated to the UE to initiate an uplink data transmission in the idle mode or the inactive mode;
monitor a search space, associated with small data traffic, identified in the message releasing the UE to the idle mode or the inactive mode for downlink data addressed to the small data RNTI; and
transmit, based at least in part on the information related to the DPUR, uplink data while in the idle mode or the inactive mode.

28. The UE of claim 27, wherein the one or more uplink resources allocated to the UE include a dedicated preamble, and wherein the memory and the one or more processors are further configured to:
transmit the dedicated preamble in a first message of a four-step random access channel (RACH) procedure; and
receive a physical uplink shared channel (PUSCH) allocation in a second message of the four-step RACH procedure, wherein the uplink data is transmitted over a PUSCH in a third message of the four-step RACH procedure.

29. The UE of claim 27, wherein the one or more uplink resources allocated to the UE include a dedicated preamble and a dedicated physical uplink shared channel (PUSCH), and wherein the uplink data is transmitted over the dedicated PUSCH using the dedicated preamble in a first message of a two-step random access channel procedure.

30. The UE of claim 27, wherein the one or more uplink resources allocated to the UE include a dedicated physical uplink shared channel (PUSCH), and wherein the uplink data is transmitted over the dedicated PUSCH while the UE is in the inactive mode.

31. The UE of claim 27, wherein the message is a radio resource control (RRC) release message.

32. The UE of claim 27, wherein the one or more uplink resources allocated to the UE include a dedicated preamble.

33. A network entity for wireless communication, comprising:
a memory; and
one or more processors, coupled with the memory, configured to:
transmit a message, that releases a user equipment (UE) to an idle mode or an inactive mode, including:
information related to a dedicated preconfigured uplink resource (DPUR),
a small data radio network temporary identifier (RNTI) used to scramble uplink data, and
an identification of a search space, associated with small data traffic, the UE is to monitor for downlink data addressed to the small data RNTI,
wherein the information related to the DPUR identifies one or more uplink resources allocated to the UE; and
receive uplink data while the UE is in the idle mode or the inactive mode.

34. The network entity of claim 33, wherein the one or more uplink resources allocated to the UE include a dedicated preamble, and wherein the memory and the one or more processors are further configured to:
receive the dedicated preamble from the UE in a first message of a four-step random access channel (RACH) procedure; and
transmit, to the UE, a physical uplink shared channel (PUSCH) allocation in a second message of the four-step RACH procedure, wherein the uplink data is received over a PUSCH in a third message of the four-step RACH procedure.

35. The network entity of claim 33, wherein the one or more uplink resources allocated to the UE include a dedicated preamble and a dedicated physical uplink shared channel (PUSCH), and wherein the uplink data is received over the dedicated PUSCH in a first message using the dedicated preamble in a two-step random access channel procedure.

36. The network entity of claim 33, wherein the one or more uplink resources allocated to the UE include a dedicated physical uplink shared channel (PUSCH), and wherein the uplink data is received over the dedicated PUSCH while the UE is in the inactive mode.

37. An apparatus for wireless communication, comprising:
means for receiving a message, that releases the apparatus to an idle mode or an inactive mode, including:
information related to a dedicated preconfigured uplink resource (DPUR), and
a small data radio network temporary identifier (RNTI) used to scramble uplink data,
wherein the information related to the DPUR identifies one or more uplink resources allocated to the apparatus to initiate an uplink data transmission in the idle mode or the inactive mode;
means for monitoring a search space, associated with small data traffic, identified in the message releasing the apparatus to the idle mode or the inactive mode for downlink data addressed to the small data RNTI; and
means for transmitting, based at least in part on the information related to the DPUR, uplink data while in the idle mode or the inactive mode.

* * * * *